United States Patent
Pasteuning et al.

(10) Patent No.: US 9,228,566 B2
(45) Date of Patent: Jan. 5, 2016

(54) WIND TURBINE COMPRISING A COOLING CIRCUIT

(75) Inventors: Jan Willem Pasteuning, Amsterdam (NL); Cornelus Johannes Antonius Versteegh, Hilversum (NL)

(73) Assignee: XEMC Darwind BV, Hilversum (NL)

(*) Notice: Subject to any disclaimer, the term of this patent is extended or adjusted under 35 U.S.C. 154(b) by 278 days.

(21) Appl. No.: 13/139,902

(22) PCT Filed: Dec. 15, 2009

(86) PCT No.: PCT/EP2009/067185
§ 371 (c)(1),
(2), (4) Date: Aug. 31, 2011

(87) PCT Pub. No.: WO2010/069954
PCT Pub. Date: Jun. 24, 2010

(65) Prior Publication Data
US 2011/0304149 A1 Dec. 15, 2011

(30) Foreign Application Priority Data
Dec. 17, 2008 (EP) .................................... 08171910

(51) Int. Cl.
*F03D 9/00* (2006.01)
*F03D 11/00* (2006.01)

(52) U.S. Cl.
CPC ............. *F03D 11/00* (2013.01); *F05B 2260/20* (2013.01); *F05B 2260/64* (2013.01); *Y02E 10/722* (2013.01)

(58) Field of Classification Search
CPC . F05B 2260/20; F05B 2260/205; H02K 9/04; H02K 9/12; H02K 9/005; H02K 9/19; Y02T 50/675; Y10S 261/87; Y10S 261/11; Y10S 165/90; F03D 11/00; Y02E 10/722

USPC ....... 290/44, 55; 415/115, 116; 416/95, 96 A, 416/97 R, 97 A
See application file for complete search history.

(56) References Cited

U.S. PATENT DOCUMENTS 3,784,171 A * 1/1974 Engalitcheff et al. ........... 261/29
4,164,256 A * 8/1979 Kelp .............................. 165/125
(Continued)

FOREIGN PATENT DOCUMENTS

CN      1745248 A     1/2006
DE      100 16913     10/2001
(Continued)

OTHER PUBLICATIONS

Official Search Report of the European Patent Office in counterpart foreign application No. PCT/ EP2009/067185 filed Dec. 15, 2009.
(Continued)

*Primary Examiner* — Tulsidas C Patel
*Assistant Examiner* — Viet Nguyen
(74) *Attorney, Agent, or Firm* — Steven M. Koehler; Westman, Champlin & Koehler P.A.

(57) ABSTRACT

Wind turbine comprising a tower with an interior enclosed by a tower wall which forms a heat exchange surface in an air cooling circuit wherein the tower interior forms a channel for guiding hot air along a flow path, wherein one or more air flow deflectors are arranged within the flow path for guiding the flow towards the tower wall. The flow deflectors can for example be active flow deflectors, such as fans or blowers, or passive flow deflectors, such as one or more static flow deflector plates or vanes, forming a static mixer element.

13 Claims, 1 Drawing Sheet

(56) References Cited

U.S. PATENT DOCUMENTS

| | | | |
|---|---|---|---|
| 4,397,793 A * | 8/1983 | Stillman et al. | 261/30 |
| 4,499,034 A * | 2/1985 | McAllister, Jr. | 261/109 |
| 6,676,122 B1 * | 1/2004 | Wobben | 290/55 |
| 7,086,823 B2 * | 8/2006 | Michaud | 415/4.2 |
| 7,504,742 B2 * | 3/2009 | Wobben | 290/55 |
| 7,637,715 B2 * | 12/2009 | Battisti | 415/115 |
| 7,938,615 B2 * | 5/2011 | Michaud | 415/4.2 |
| 8,053,918 B2 * | 11/2011 | Wobben | 290/55 |
| 8,304,941 B2 * | 11/2012 | Mantere | 310/64 |
| 8,319,362 B2 * | 11/2012 | Vihriala et al. | 290/44 |
| 2009/0045628 A1 * | 2/2009 | Erdman et al. | 290/44 |
| 2010/0133824 A1 * | 6/2010 | Gao | 290/44 |
| 2011/0133483 A1 * | 6/2011 | Yoneda et al. | 290/1 B |
| 2012/0074711 A1 * | 3/2012 | Sato et al. | 290/55 |
| 2012/0326446 A1 * | 12/2012 | Ono et al. | 290/55 |

FOREIGN PATENT DOCUMENTS

| | | |
|---|---|---|
| DE | 10 2004 061391 | 7/2006 |
| EP | 1736665 A2 | 6/2006 |
| WO | WO 99/30031 | 6/1999 |
| WO | WO 01/06121 | 1/2001 |
| WO | WO 01/77526 | 10/2001 |
| WO | WO 2007/110718 | 10/2007 |
| WO | WO 2007110718 A2 * | 10/2007 |

OTHER PUBLICATIONS

Written Opinion of the European Patent Office in counterpart foreign application No. PCT/ EP2009/067185 filed Dec. 15, 2009.
State Intellectual Property Office of the People's Republic of China, Notification of the First Office Action, Date of Notification Mar. 11, 2013.

* cited by examiner

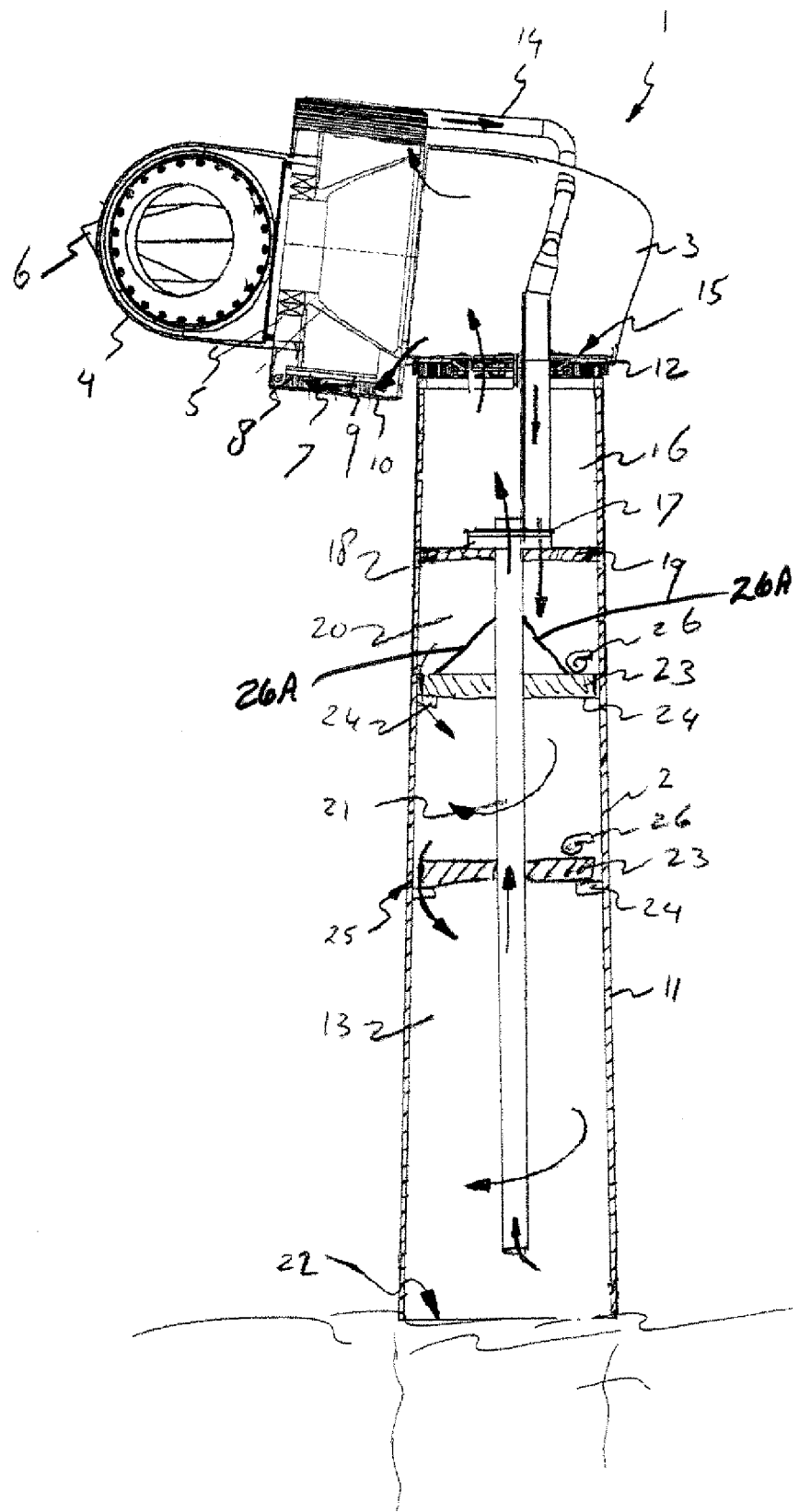

WIND TURBINE COMPRISING A COOLING CIRCUIT

CROSS-REFERENCE TO RELATED APPLICATION

This application is a Section 371 National Stage Application of International Application PCT/EP2009/067185 filed Dec. 15, 2009 and published as WO/2010/069954 in English.

BACKGROUND

The discussion below is merely provided for general background information and is not intended to be used as an aid in determining the scope of the claimed subject matter.

Aspects of the present invention relate to a wind turbine comprising a cooling circuit, particularly for discharging heat generated by electrical equipment in the wind turbine.

Energy conversion results in energy being lost in the form of heat. In the main driving line of a wind turbine, which is typically mounted in the nacelle, losses occur in the gears, at the bearings, and in the generator or at other control units, such as, e.g., in the hydraulic systems or similar control and regulation pitch and yaw units. For gearless direct drive wind turbines the main losses occur at the generator area in the nacelle. For the power supply, losses occur at the power transformer and in possibly present other power electronics, e.g., in the rectifier.

Generators in wind turbines are typically cooled by an air flow through the air gap between the generator rotor and stator, and over the sections containing the coils where most of the heat is generated. Corrosion sensitivity requires that the materials near the air gap should only be subjected to dry and clean air. For this purpose, closed air cooling circuits are generally used. Closed cooling circuits have the advantage that no outside air needs to enter the generator area which is particularly useful for offshore wind turbines where the outside air is humid and has a high salt particle content. A secondary air-to-air system can be used to transfer the heat to the outside air. Alternatively, air from the turbine interior can be circulated via the air gap. For turbines comprising a steel tower, the tower wall can be used to dissipate the heat from the air circulation system. In a closed or partly closed cooling circuit, the cooling air circulates within the wind turbine from its nacelle to the tower or to the base of the wind turbine and the energy stored by the coolant, such as air, during the cooling is dissipated via the tower wall of the wind turbine. The tower of the wind turbine is exposed to wind, enhancing the effectiveness of the wind turbine tower as a cooling element or a heat exchanger. In order to use the complete tower length effectively the air should be forced to have a vertical flow, top-down or bottom-up.

WO 01/06121 discloses a wind turbine with a closed cooling circuit and a tower being integrated into the cooling circuit as a cooling element. Channels guide the hot air closely along the interior side of the tower wall. Similarly, in DE 100 16 913 A spiralling channels are used to guide hot air along the inner surface of a wind turbine tower wall. This way, a closed cooling circuit can be obtained circulating hot air which is cooled by the tower wall.

The channels used in WO 01/06121 and DE 100 16 913 A complicate the construction of the wind turbine tower. Moreover, the passage of the channel forms a bottle neck for the circulating amount of air, which may not be sufficient for effective cooling of the generator area.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In one aspect of the invention, a wind turbine includes a tower wall forming a heat exchange surface in an air cooling circuit wherein the tower interior forms a channel for guiding hot air, and wherein the tower comprises one or more air flow deflectors for guiding the flow towards the tower wall. This way, the tower interior as such is used as a channel and no special channels are required for bringing the hot air in intimate contact with the tower wall heat exchange surface. While the hot air passes the tower wall, the flow deflectors cause turbulence within the air flow bringing all the air in intimate contact with the tower wall, so all the air in the tower is evenly cooled. While the main flow is vertical, the flow deflectors add a horizontal, e.g., radial, component to the flow direction, towards the tower wall. It is effectively prevented that only the air near the tower wall is cooled. The temperature gradient between the tower wall and adjacent hot air is increased, resulting in increased heat dissipation. In this context, the "tower interior" is the room confined by the tower wall housing the equipment present in the tower.

The use of materials with higher heat conductivity, such as steel, will improve heat dissipation by the tower wall.

The wind turbine can for example comprise one or more return channels for guiding hot air from a generator area to a section of the tower below the generator area. After cooling, the air can then be returned to the generator area.

The flow deflectors can be active flow deflectors, such as fans or blowers, or passive flow deflectors, such as one or more static flow deflector plates or vanes, forming a static mixer element.

In a specific embodiment, one or more of the return channels ends in a blower for blowing air in a direction with a horizontal component, e.g., in a radial and/or tangential direction.

The tower of the wind turbine comprises horizontal floors with a gap between each floor and the tower wall. The gap can for example be 1-5 cm, e.g., about 3 cm. This way, the air flow can pass the floors. The floors help to force the air to flow along the tower wall. The floors can for example be supported by a number of supports or brackets.

The generator of the wind turbine is generally located in the nacelle, which can be rotatable by means of a yawing system. Since the return channel leading hot air from the nacelle to the tower, needs to rotate together with the nacelle being yawed, a channel can be used leading from the nacelle to a floor in the tower, where it is connected to a rotatable lid of a transition drum, the transition drum having a diameter corresponding to the distance of the outer fiber of the first return channel section to a center axis of the wind turbine tower, and wherein the transition drum has a bottom with an opening leading to a further air flow path. When the nacelle is yawed, the channel can rotate with the nacelle without interruption of the air flow.

Optionally, a second channel can be arranged coaxially with the tower wall, leading from a lower tower section to the transition drum, and passing the rotatable lid, which is rotatable around the second channel. Such a channel can be used as a return channel leading cooled air from the lower tower section upwardly on its way back to the generator area.

The wind turbine can be a wind turbine with a gear transmission or it can be a gearless direct drive wind turbine. The cooling system of the wind turbine is particularly suitable for offshore wind turbines, since a closed cooling circuit can be obtained protecting the electric equipment, such as the generator against the salty and humid air of the marine environment. Optionally, the generator area can be pressurized. Optionally, hot air can also flow via the interior of the blades, which may contribute to prevent icing on the blades.

BRIEF DESCRIPTION OF THE DRAWING

Aspects of the present invention will be further explained under reference to the accompanying drawings. In the drawings:

FIG. 1: shows in cross section a wind turbine.

DETAILED DESCRIPTION OF THE ILLUSTRATIVE EMBODIMENT

FIG. 1 shows an offshore wind turbine 1 comprising a wind turbine tower 2, with a nacelle 3 or gondola on top of the tower 2, and a rotor 4 comprising a hub 5 and three rotor blades 6, only one of the blades 6 being visible in the shown cross section. The nacelle 3 comprises a generator area 7 encasing a permanent magnet generator 8 comprising a generator rotor 9 surrounded by a stator 10. The generator rotor 9 is linked to the wind driven rotor 4, without gear transmission. Generated electricity is discharged via power cables to a grid. To rotate the rotor 4 towards the wind, the nacelle 3 can be yawed in the desired direction via a yaw transmission 12 by means of a yaw drive. To protect the equipment in the nacelle 3 from the humid and saline offshore environment, the nacelle 3 is air sealed and pressurized.

Kinetic energy of ambient wind is converted via the rotor 4 by the generator 8 into electricity. This energy conversion generates heat. To cool the generator area 7, a closed air cooling circuit is provided within the wind turbine 1. Hot air from the generator area is discharged out of the nacelle 3 via an exterior pipeline 14. The air flow is indicated by the arrows in the drawing. Pipeline 14 re-enters the nacelle 3 and crosses the nacelle floor 15 to enter an upper section 16 of the tower 2. Pipeline 14 is connected to a rotatable lid 17 of a drum 18 positioned centrally on the floor 19 of the tower upper section 16. The diameter of the drum 18 and its rotatable lid 17 is at least the diameter of the rotation made by the outer fiber of the pipeline 14 when the nacelle is yawed. The bottom of drum 18 opens into the tower interior below floor 19. This way, the pipeline 14 remains in open connection to the interior 13 of tower section 20 below floor 19 during yawing of the nacelle 3. Tower interior 13 forms a channel, defining a flow path for the hot air along steel tower wall 11 from pipe line 14 downwards to bottom section 22 of the tower 2. A second pipeline 21 leads from the bottom section 22 of the tower 2 to the tower section 16 passing the lid 17. The lid 17 is rotatable around the pipeline 21.

Tower section 20 is divided by a number of floors 23. The floors 23 rest on a number of supports 24. Between the floors 23 and the wall of the tower 2 remains a gap 25 of about 3 cm, so the air flow can pass the floors 23. On each floor 23, flow deflectors such as one or more blowers 26 blow the hot air into a tangential direction. This creates turbulence and vortices in the air flow. As a result, a larger part of the hot air will contact the wall of the tower 2 and will thus be cooled effectively. While the main flow is vertical, the flow deflectors add a horizontal, e.g., radial, component to the flow direction, towards the tower wall. The flow deflectors can be active flow deflectors, such as fans or blowers 26, or passive flow deflectors, such as one or more static flow deflector plates or vanes 26A, forming a static mixer element.

The net air flow is downwards. When the air arrives at the bottom section 22 of the tower 2, the air is cooled and drawn into the second pipeline 21. The pipeline 21 leads the cooled air to the upper tower section 16, where it passes the nacelle floor 15 and flows into the generator area 7 and cools the generator 8. Fans can be used to guide the air flow to the hottest parts, e.g., to the air gap between the generator rotor 9 and the stator 10. To force the hot air to flow downwardly and the cold air to flow upwardly, an air pump can be used, such as one or more fans and/or compressors or the like, e.g., at the inlet of the pipeline 21 at the bottom floor section 22 of the tower 2.

In an alternative embodiment, the hot air from pipeline 14 can be forced to flow downwardly via pipeline 21 to the bottom section 22 where it can flow upwardly via the tower wall. In that case, floor 19 should also leave a gap with the tower wall.

What is claimed is:

1. A wind turbine comprising a nacelle and a tower supporting the nacelle, the tower having an interior enclosed from an exterior by a tower wall which forms a heat exchange surface between the interior and the exterior in a recirculating air cooling circuit wherein the tower interior forms a first channel configured to guide hot air along a flow path, and wherein the recirculating air cooling circuit comprises a second channel, the second channel including a conduit portion separated from the tower wall and extending upwardly from a lower section of the tower interior, wherein the tower interior comprises a series of interior spaces separated by floors comprising apertures connecting the interior spaces, and wherein the at least one of the interior spaces comprises an air flow deflector arranged within the flow path in the first channel and configured to guide the flow horizontally towards the tower wall.

2. The wind turbine according to claim 1 wherein the first channel comprises one or more return channels configured to guide hot air from a generator area to a section of the tower below the generator area.

3. The wind turbine according to claim 1 wherein air flow deflector comprises a blower configured to blow air towards the tower wall.

4. The wind turbine according to claim 3 wherein the blower is configured to direct the air in a tangential direction.

5. The wind turbine according to claim 3 wherein the blower is configured to direct the air in a radial direction.

6. The wind turbine according to claim 1 wherein the deflector is a static flow deflector plate.

7. The wind turbine according to claim 1 wherein the first channel comprises a gap between each floor and the tower wall.

8. The wind turbine according to claim 1 wherein the generator of the wind turbine is located in the nacelle.

9. The wind turbine according to claim 8 wherein the nacelle includes a yawing system configured to rotate the nacelle relative to the tower and wherein a third channel leads from the nacelle to a floor in the tower, where the third channel is connected to a rotatable lid of a transition drum, the transition drum having a diameter corresponding to the distance of an outer fiber of the third channel to a center axis of the wind turbine tower, and wherein the transition drum has a bottom with an opening leading to a further air flow path.

10. The wind turbine according to claim 9 wherein the second channel leads from a lower tower section to the transition drum, passing the rotatable lid, which is rotatable around the second channel.

11. The wind turbine of claim 1, wherein each interior space comprises a deflector arranged within the flow path in the first channel and configured to guide the flow horizontally towards the tower wall.

12. A wind turbine comprising a nacelle and a tower supporting the nacelle, the tower having an interior enclosed from an exterior by a tower wall which forms a heat exchange surface between the interior and the exterior in a recirculating air cooling circuit wherein the tower interior forms a first channel configured to guide hot air along a flow path, and wherein the recirculating air cooling circuit comprises a second channel, the second channel including a conduit portion separated from the tower wall and extending upwardly from a lower section of the tower interior, wherein the first channel comprises a series of interior spaces separated by barriers comprising apertures connecting the interior spaces, and wherein at least one of the interior spaces comprises an air flow deflector arranged within the flow path in the first channel and configured to guide the flow horizontally towards the tower wall, the second channel having an open end disposed in a within a lowermost interior space of the first channel.

13. A wind turbine comprising a nacelle and a tower supporting the nacelle, the tower having an interior enclosed from an exterior by a tower wall which forms a heat exchange surface between the interior and the exterior in a recirculating air cooling circuit wherein the tower interior forms a first channel configured to guide hot air along a flow path downward through the tower, and wherein the recirculating air cooling circuit comprises a second channel fluidly coupled to the first channel and extending upwardly from a lower section of the tower interior, the second channel being a conduit extending upward through the tower, and configured to guide cool air upwardly through the tower and to separate air flow through the first channel from air flow through the second channel, wherein the first channel comprises a series of interior spaces separated by floors comprising apertures connecting the interior spaces, and wherein at least one of the interior spaces comprises an air flow deflector arranged within the flow path in the first channel and configured to guide the flow horizontally towards the tower wall, the second channel having an inlet disposed within a lowermost interior space of the first channel.

* * * * *